United States Patent
Sedlmaier et al.

(10) Patent No.: US 6,360,624 B1
(45) Date of Patent: Mar. 26, 2002

(54) MOTOR VEHICLE HAVING A SELECTING DEVICE

(75) Inventors: Anette Sedlmaier, Fahrenzhausen; Alois Abel, Rohrbach; Rudolf Ehrmaier, Munich; Josef Neuner, Raubling; Sigmund Fuerst, Maisach, all of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/549,579

(22) Filed: Apr. 14, 2000

(30) Foreign Application Priority Data

Apr. 14, 1999 (DE) .......................... 199 16 924

(51) Int. Cl.⁷ .............................................. F16H 61/24
(52) U.S. Cl. ....................................... 74/335; 74/473.12
(58) Field of Search ....................... 74/473.32, 473.12, 74/335

(56) References Cited

U.S. PATENT DOCUMENTS

| | | | |
|---|---|---|---|
| 4,649,768 A | * 3/1987 | Kusaka et al. ............ 74/484 R |
| 4,817,468 A | * 4/1989 | Leigh-Monstevens et al. .......... 74/335 |
| 5,197,344 A | * 3/1993 | Maier et al. ................... 74/335 |
| 5,514,048 A | * 5/1996 | Jacobson et al. ............. 477/99 |
| 6,076,414 A | * 6/2000 | Tabata et al. ................. 74/335 |
| 6,151,977 A | * 11/2000 | Menig et al. ............. 74/336 R |

FOREIGN PATENT DOCUMENTS

| | | |
|---|---|---|
| DE | 42 33 938 | 4/1994 |
| DE | 196 37 533 | 3/1998 |
| DE | 197 14 495 | 10/1998 |
| DE | 197 37 296 | 3/1999 |
| JP | 3-157229 | * 7/1991 |

* cited by examiner

Primary Examiner—David Fenstermacher
(74) Attorney, Agent, or Firm—Crowell & Moring LLP

(57) ABSTRACT

A motor vehicle having a driving engine and an automatically shifted transmission, particularly an automatic transmission, includes at least one selector lever used as the operating element. With this selector lever, a driver triggers an electric transmission control device which, as a function of an operating position for the automatically shifted transmission selected on the selector lever and of other operating parameters of the motor vehicle, controls the automatically shifted transmission. By deflecting the selector lever, certain operation positions of the automatically shifted transmission are selected. This selector lever can be moved along at least one shifting channel, for preselecting individual driving positions in the automatic operation, into at least two deflecting directions. The lever automatically returns from the two deflecting positions always into the same starting position. Always the same driving position of the automatically shifted transmission is assigned to each deflecting direction of the selector lever in the shifting channel for the preselecting of individual driving positions in the automatic operation, and, in at least one deflecting direction of the selector lever, two different driving positions can be selected. The selector lever, for selecting a first driving position, is movable a first distance to a first stop in the deflecting direction, and, for selecting a second driving position, the selector lever is movable a second, longer distance to a second stop in the same deflecting direction, in which case the first stop is overpressed.

24 Claims, 2 Drawing Sheets

MOTOR VEHICLE HAVING A SELECTING DEVICE

BACKGROUND AND SUMMARY OF THE INVENTION

This application claims the priority of German Application No. 199 16 924.1, filed Apr. 14, 1999, the disclosure of which is expressly incorporated by reference herein.

The invention relates to a motor vehicle having a selecting device for selecting operating positions of a motor vehicle transmission.

German Patent Document DE 197 14 495 A1 describes such a selecting device, in which case the display of the currently selected operating position and the display of each individual selectable operating position is always shown at the same point of the display device. For selecting a defined operating position, the control element must in each case always be respectively deflected into the same direction.

According to the prior art, a selector lever can be displaced in two parallel operating planes and one operating plane arranged perpendicularly thereto. In this case, four moving directions occur for selecting a new operating position of an automatic transmission for the step-by-step shifting and automatic driving position system operating modes. In order to achieve six selectable operating positions with four possible movement directions, two different operating positions in the longitudinal direction of the vehicle are required for the selector lever. One operating position is that for the step-by-step operating mode. The other operating position is the starting position of the selector lever of the automatic transmission in the automatic driving position system operating mode. Between these two operating positions, the selector lever can be shifted back and forth in the transverse direction.

In the step-by-step shifting operating position, the individual gears can be manually shifted by moving the selector lever. In this case, the selector lever automatically always returns into its operating position for the step-by-step operating mode. The other operating position of the selector lever, into which the selector lever can be moved by a pivoting in the transverse direction of the vehicle, is used for the automatic driving position operating mode. The deflecting directions in this operating position point in the longitudinal direction of the vehicle, as well as in the transverse direction of the vehicle. The selector lever returns automatically also in the automatic driving position operating mode.

By means of an analyzing circuit, (not shown in the reference), a display device is triggered. The display device is mounted in the viewing area of the driver and displays the operating position currently selected by means of the selector lever, as well as the additional optionally selectable operating positions of the motor vehicle transmission. In this case, more operating positions of the motor vehicle transmission can be used than deflecting directions exist for the control element—the selector lever. Furthermore, the display of each individual non-selected operating position is always shown at the same point of the display device. When selecting a new operating position using the selector lever, this selector lever is in each case deflected in the same direction for a certain operating position respectively.

A selector lever, by means of which using four possible movement directions, six selectable operating positions can be selected, has the disadvantage that no simple intuitive operating concept can be achieved for the driver. This is because the selector lever must be moved not only in the longitudinal direction of the vehicle, but also in the transverse direction of the vehicle.

It is therefore an object of the invention to provide a motor vehicle having an automatically shifted transmission, which is triggered by way of an electric transmission control device, whose operating positions can be triggered in an intuitively simple manner by the driver using a selector lever.

According to the invention, this object is achieved in that at least one selector lever is used as the operating element in the case of a motor vehicle having a driving motor and an automatically shifted transmission, particularly an automatic transmission. By means of this selector lever, a driver triggers an electric transmission control device which, as a function of an operating position for the automatically shifted transmission selected on the selector lever and of other operating parameters of the motor vehicle, controls the automatically shifted transmission, in which case, by deflecting the selector lever, certain operation positions of the automatically shifted transmission are selected, and this selector lever can be moved along at least one shifting channel for preselecting individual driving positions in the automatic operation, into at least two deflecting directions and automatically returns from the two deflecting positions into always the same starting position. In this case, always the same driving position of the automatically shifted transmission is assigned to each deflecting direction of the selector lever in the shifting channel for the preselecting of individual driving positions in the automatic operation, and, in at least one deflecting direction of the selector lever, two different driving positions can be selected in that the selector lever, for selecting a first driving position, can be moved a first distance to a first stop in the deflecting direction, and, for selecting a second driving position, the selector lever can be moved a second longer distance to a second stop into the same deflecting direction, in which case the first stop can be overpressed.

This has the advantage that, also in the event of a breakdown of the display device for the operating positions, a secure and comfortable engagement of each operating position can be carried out by the driver. The operating concept is easily remembered and can be intuitively understood. A parking position function can be designed so that it can be automatically engaged.

In a preferred embodiment of the invention, up to four different driving positions can be selected using the selector lever, which can be moved into two deflecting directions. The selector lever can be moved in both deflecting directions for selecting one driving position respectively in each case to a first stop, and, for selecting another driving position respectively, the selector lever can be moved a second larger distance in each case by overpressing the first stop, to a second stop.

This has the advantage that, using the selector lever, in a shifting plane, at least the four absolutely required driving positions for the automatic positions can be selected, such as the driving operation (D), the reversing operation (R), the neutral position (N) in which no driving force is transmitted to the vehicle wheels; and the parking position (P) in which a parking brake blocks the driving wheels.

An advantageous embodiment of the invention is characterized in that, by means of the selector lever, which can be moved in two deflecting directions, the driving position N is selected, in that the selector lever is moved into one of the deflecting directions to the first stop.

Thus, by tipping (pivoting) the selector lever, in contrast to the overpressing, the neutral position of the automatically shiftable transmission is engaged, In a preferred embodiment of the invention, in which the selector lever can be moved in a steering wheel plane, the driving position N can be engaged by a tipping in the upward direction, if prior to that the driving positions P or D were engaged. By a tipping in the downward direction, the driving position N can be engaged if prior to that the driving positions P or R were engaged.

Another preferred embodiment of the invention is characterized in that, by means of the selector lever, which can be moved in two deflecting directions, the driving position P is selected in that the selector lever is moved into one of the deflecting directions to the first stop. The driving position P is advantageously engaged here by means of tipping, in which case it may also be provided that the driving positions P, R and N are sequentially engaged by means of tipping. For driving position D, it must then be provided that it can basically only be engaged by overpressing, but from any position. Likewise, it may preferably be provided that the driving position P is engaged from any position by overpressing. In the case of the sequential shifting of the driving positions P, R, N and D, it is important that at least one end position is achieved from any position by overpressing.

In other advantageous embodiments of the invention, it can then be provided that, by means of the selector lever, which can be moved into two deflecting directions, the driving position R is selected in that the selector lever is moved into one of the deflecting directions to the first stop, or that, by means of the selector lever which can be moved into two deflecting directions, the driving position R is selected, in that this selector lever is moved into one of the deflecting directions, particularly in a direction which is directed upward in a steering wheel plane, by overpressing the first stop, to the second stop. Furthermore, a preferred embodiment of the invention is characterized in that, by means of the selector lever which can be moved into two deflecting directions, the driving position D is selected. This selector lever is moved into one of the deflecting directions, particularly into a direction which is directed downward in a steering wheel plane, by overpressing the first stop, to the second stop. In the case of this solution, the overpressing is always required for the drive connection position. The driver's intention is recognized independently of the actual position and the history, which results in a secure and intuitive operating concept.

In the case of another preferred embodiment of the invention, the operating position (P—the parking function) is automatically engaged by the transmission control device when certain operating parameters are present. As an alternative and/or in addition, the operating position P can be engaged by operating a manually operable operating device, particularly a tip switch on the selector lever, which is independent of the selector lever movement.

This has the advantage that engagement of the parking position using the operating device is clearly separated from the selection of the other driving positions, which further increases the clarity and the intuitive operating possibility.

When a visual indicating device is present, which displays the respectively engaged operating position and the operating position which can be engaged by the selector lever with the operating direction and operating mode of the selector lever required for this purpose, this has the advantage that control and information possibilities for the driver increase the operating reliability of the selecting device. This is particularly advantageous if, by way of the electric transmission control device, alternative operating possibilities of the automatically shifted transmission can be selected, for example, the step-by-step shifting of the gears in the manual operation or the preselecting of individual driving positions in the automatic operation (D, R, N, P) on the basis of another characteristic shifting curve, particularly with a sportier adaptation.

Another preferred embodiment of the invention provides that the operating positions of the automatically shifted transmission in the alternative operation are selected at least partially by the selector lever. Here, the operating positions additionally at least partially can be displayed by the visual indicating device. Thus, the selecting device is advantageously designed such that the driver is able to decide to use the step-by-step shifting operation or the automatic driving position system, without the requirement of additional operating elements or indicating devices.

Other objects, advantages and novel features of the present invention will become apparent from the following detailed description of the invention when considered in conjunction with the accompanying drawings.

DETAILED DESCRIPTION OF THE DRAWINGS

Figure 1:
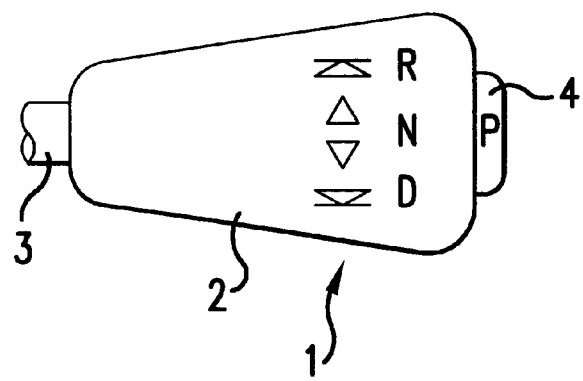
FIG. 1 is a schematic view of a selector lever (only partially illustrated), which automatically returns into its operating position, the selector lever being mounted on the steering column (not shown) of a motor vehicle.

According to FIG. 1, a selector lever 1 consists of an operating knob 2, which is mounted at the end of a selector lever rod 3. By means of its other, not shown, end, the selector lever rod 3 is mounted on a steering column, which is not shown, of a motor vehicle and is swivellable in two deflecting directions in a plane of a steering wheel, which is not shown, in the upward and downward direction. The selector lever 1 is used as a selecting device for engaging the individual driving positions of a motor vehicle transmission and has, for this purpose, electric contacts on the other end of the selector lever rod 3. By the closing of the contacts when the selector lever 1 is operated, the switching commands are emitted to an analyzing circuit. The analyzing circuit is not an object of the invention and is therefore not illustrated and explained in detail. It should only be mentioned that it can easily be built by a person skilled in the art and preferably contains a microcomputer. The task of the analyzing circuit is, on the one hand, to trigger control elements for a vehicle transmission (also not shown) On the other hand, it determines a display image for a display device for a gear display in the driver's viewing area.

The selector lever 1 can be moved in two deflecting directions, i.e., in the upward and the downward direction in the steering wheel plane, from which it automatically always returns into the same starting position. In this case, the same respective driving position of an automatically shifted transmission is assigned to each deflecting direction of the selector lever 1, and two different driving positions can be selected in both deflecting directions of the selector lever 1. For selecting a first driving position, the selector lever can be moved upward by a first distance to a first stop in the deflecting direction, and, for selecting a second driving position, the selector lever can be moved a second larger distance to a second stop into the same deflecting direction, in which case the first stop can be overpressed. The same method of the selector lever 1 for selecting driving positions is also implemented in the downward deflecting direction. This is also outlined by the marking on the operating knob 2. Here, the selectable driving positions of an automatic transmission are indicated by R, N, D, together with the symbols ◊ and ◊. In this case, ▽ and △ means "overpressing" of the selector lever 1 in the direction of the vertex of the triangle of the respective symbol, in each case, for engaging the driving position R or D shown next to it. Thus, four deflecting possibilities for the selector lever 1 are obtained, which are combined with three driving positions. By a "tipping" of the selector lever 1 in the upward or downward direction, the driving position N is selected; by an "overpressing" of the selector lever 1 in the upward direction, the driving position R is selected and by the "overpressing" of the selector lever 1 in the downward direction, the driving position D is selected. If a separate switch on the selector lever 1 is operated, which is constructed as a toggle switch 4, the driving position P parking brake device—is engaged.

The analyzing circuit (not shown) triggers a display device, which is mounted in the driver's viewing area and which displays the operating position currently selected by the selector lever 1 as well as the additional, optionally selectable operating positions of the motor vehicle transmission. The display of each individual, non-selected operating position is always shown at the same point of the display device. When selecting a new operating position using the selector lever 1, it is in each case, for a certain operating position, deflected always in the same direction, tipped or overpressed.

This is illustrated by FIGS. 2a–2f showing six different display images of the display device in the driver's viewing range. The black symbols in the figure outline, for example, an illumination and, as a result, show the currently selectable driving positions and the movement of the selector lever 1 required for this purpose; whereas the circles and surfaces shown in black indicate the currently engaged driving position. The description is based on the representation of the display device at the top left (FIG. 2a), which shows that the driving position P is engaged in that the left display field has a black background, for example, it is illuminated. In the central display field of FIG. 2a, all driving positions R, N, D, are marked by black symbols; that is, any of the driving positions can be selected, while the three illumination circles indicate that no driving position is engaged. The driving position N can be engaged by a tipping of the selector lever 1 in the upward or downward direction, or the driving position D can be engaged by the overpressing of the selector lever 1 in the downward direction, or the driving position R can be engaged by the overpressing of the selector lever 1 in the upward direction.

Figure 2A:
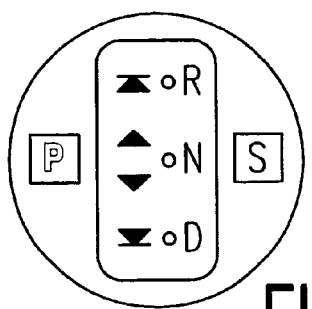
FIGS. 2a–2f are views of six different individual display images of a display device for a selector lever corresponding to FIG. 1, with five display fields respectively and an assigned, outlined selector lever movement.
Figure 2D:
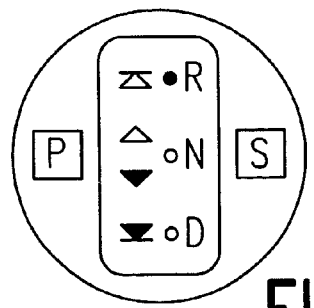
Figure 2B:
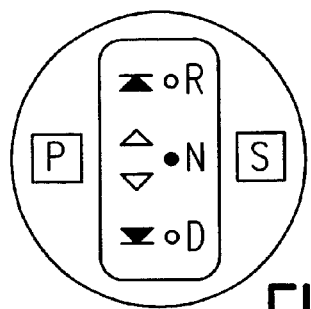
Figure 2E:
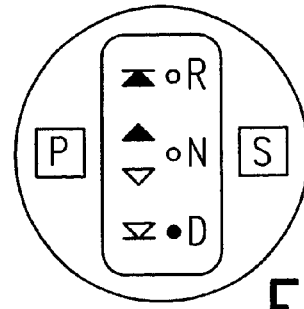
Figure 2C:
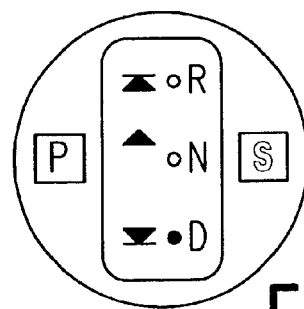

The representation of the display device in FIG. 2b shows that the driving position N was engaged by the tipping on the selector lever 1, because its illumination circle in the center display field is black. The driving position P appears in the left display field which can now be selected again. The representation of the display device in FIG. 2c shows that the driving position D was engaged by the overpressing of the selector lever 1 in the downward direction. In the black right display field, it is now indicated by means of S that a sporty program was selected. The sporty program was selected using a separate tip switch which is not shown.

Figure 2F:
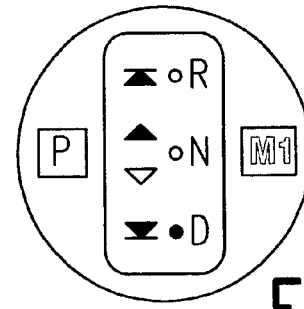

As illustrated by the representation of the display device in FIG. 2d, the driving position R was now engaged by the overpressing of the selector lever 1 in the upward direction. The next image of the display device in FIG. 2e shows that the driving position D was engaged again by the overpressing of the selector lever 1 in the downward direction. The representation of the display device in FIG. 2f shows that the driving position D remains engaged and that in the black right display field, the gear position M1 or M2 . . . M5 is displayed, depending on which gear position was manually engaged in the transmission. In this step-by-step shifting operating mode, it is now possible to manually shift the gears. During the change between the operating modes by operating a separate tip switch (not shown) in the step-by-step shifting operating mode, precisely that gear is taken over which was engaged in the automatic driving position operating mode. By means of the corresponding number, the right display field shows in the manual step-by-step operating mode position the respectively engaged gear.

Figure 3:
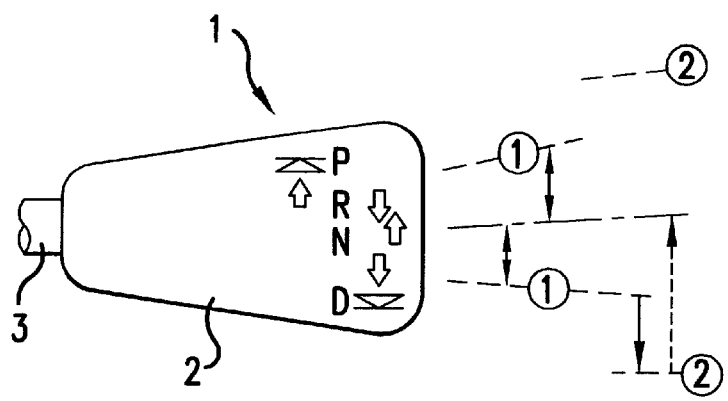
FIG. 3 is a schematic view of another embodiment of a selector lever (only partially illustrated) which automatically returns into its operating position, the selector lever being mounted on a steering column (not shown) of a motor vehicle, with operating paths and directions being outlined by reference lines and direction arrows.

FIG. 3 shows another embodiment of an only partially illustrated selector lever 1 which automatically returns into its operating position and whose fastening point, which is not shown, is the steering column of a motor vehicle, with operating distances and directions outlined by reference lines and direction arrows. The selector lever 1 also consists of an operating knob 2 mounted on the end of the selector lever rod 3. By means of its other, not shown, end, the selector lever rod 3 is mounted on a steering column of a motor vehicle and is swivellable in two deflecting directions in a plane of a steering wheel n the upward and downward direction. Corresponding to the description of FIG. 1, the selector lever 1 can be moved into two deflecting directions in the upward and in the downward direction in the steering wheel plane, from which it automatically always returns into the same starting position. In this case, the driving positions P, R, N can be sequentially engaged by means of "tipping", while the driving position D can be engaged only by "overpressing", but from any position. Likewise, the driving position P can be reached from any position by "overpressing". This is also outlined by the marking of the operating knob 2. Here, the selectable driving positions of the automatic transmission are indicated by P, R, N, D, together with the symbols ↑ and ⇑. In this case ⇑ means "overpressing" of the selector lever 1, in the direction of the vertex of the triangle of the respective symbol, in each case of engaging the driving position P or D illustrated next to it. ↑ means "tipping of the selector lever 1, in the direction of the tip of the arrow of the symbol, in each case for engaging the driving position R or N illustrated next to it. Four deflecting possibilities are obtained again for the selector lever 1; two in which it is moved by means of "tipping" a first distance respectively to a first stop ① into the upward or downward deflecting direction; and two, in that the selector lever 1 is moved by "overpressing" a second larger distance respectively to a second stop ②️ in the same deflecting directions, in which case the first stop is overpressed.

FIGS. 4a–4f show six different display images of the display device in the driver's viewing range. The black symbols in the figure outline, for example, an illumination and, as the result, show the currently selectable driving positions and the movement of the selector lever 1 required for this purpose; whereas the black letters indicate the currently engaged driving position. This description begins with the representation of the display device in FIG. 4a, which shows that the driving position P is engaged in that the left display field has a black background, that is, it is illuminated for example. When they are selectable, the driving positions R or D are characterized by means of black symbols; that is, any of the driving positions can be selected; the driving position R, by tipping the selector lever 1 downward, or the driving position D, by overpressing the selector lever 1 downward.

Figure 4A:
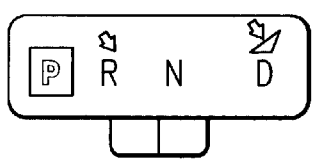
FIGS. 4a–4f are views of six different individual display images of a display device for a selector lever corresponding to FIG. 3, with six display fields respectively and an assigned, outlined selector lever movement.
Figure 4B:
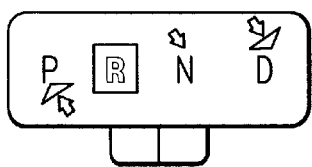
Figure 4C:
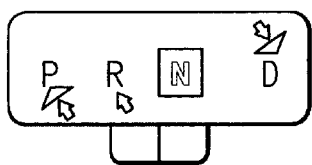
Figure 4D:
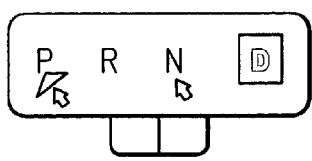
Figure 4E:
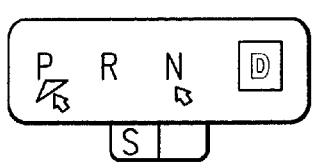

The next representation of the display device in FIG. 4b shows that, by tipping downward at the selector lever 1, the driving position R was engaged, because its display image has a black background. Now the driving positions P, N or D can be selected. The representation of the display device in FIG. 4c shows that the driving position N was engaged by the tipping of the selector lever 1 in the downward direction. As illustrated by the representation of the display device in FIG. 4d, the driving position D was now engaged by overpressing the selector lever 1 in the downward direction. FIG. 4e shows that the driving position D is engaged again. In the left lower display field, it is now indicated by means of S that a sporty program with another characteristic shifting curve was selected.

Figure 4F:
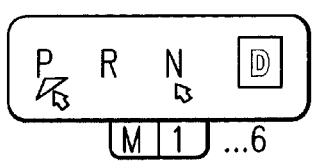

The representation of the display device in FIG. 4f shows that the driving position D remains engaged and that, in the lower display field, the gear position M1 or M2 . . . M6 is now displayed, depending on which gear position was manually engaged in the transmission. In this manual step-by-step shifting operating mode, it is now possible to manually shift the gears. During the change between the operating modes, precisely that gear is taken over in the step-by-step shifting operating mode which was engaged in the automatic driving position operating mode. By means of the corresponding number, the lower display field shows in the step-by-step shifting operating mode operating position, the respectively engaged gear.

Figure 5:
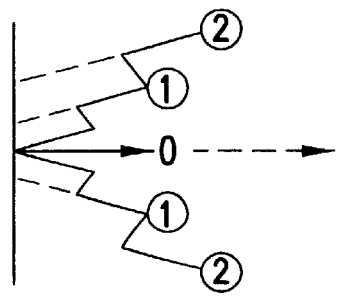
FIG. 5 is a force-path diagram for a selector lever corresponding to FIGS. 1 and 3, the operating force for the selector lever movement being entered along the abscissa and the deflecting path of the selector lever movement being entered along the ordinate.

FIG. 5 shows a force-path diagram for a selector lever corresponding to FIGS. 1 and 3, the operating force for the selector lever movement being entered along the abscissa, and the deflecting path of the selector lever movement being entered along the ordinate. The selector lever 1 can be moved along a shifting channel, for the preselecting of individual driving positions in the automatic operation P, R, D, N into two deflecting directions and automatically always returns into the same starting position from both deflecting directions. In both deflecting directions of the selector lever 1, two different driving positions P, R, D, N can be selected in that, for selecting a first driving position R,N, the selector lever 1 can be moved a first distance to a first stop ①️ into the deflecting direction and, for selecting a second driving position, the selector lever 1 can be moved a second larger distance to a second stop ②️ into the same deflecting direction, the first stop ①️ being overpressed. Thus, by means of the selector lever 1, which can be moved into two deflecting directions, up to four different driving positions P, R, D, N can be selected.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle having a driving engine and an automatically shifted transmission with, as an operating element, at least one selector lever by which a driver triggers an electric transmission control device which, as a function of an operating position selected at the selector lever for the automatically shifted transmission, and as a function of other operating parameters of the motor vehicle, controls the automatically shifted transmission, wherein by deflecting the selector lever, certain operating positions of the automatically shifted transmission are selectable, and the selector lever moves along at least one shifting channel for the preselecting of individual driving positions (D, R, N, P) in an automatic operation in at least two deflecting directions and automatically returning from the two deflecting directions always into the same starting position, in each case, the same driving position (D, R, N, P) of the automatically shifted transmission being assigned to each deflecting direction of the selector lever in the shifting channel for preselecting individual driving positions (D, R, N, P) in the automatic operation, wherein in at least one deflecting direction of the selector lever, two different driving positions (D, R, N, P) can be selected, wherein for selecting a first driving position (D, R, N, P), the selector lever is moved a first distance to a first stop in the deflecting direction, and, for selecting a second driving position (D, R, N, P), the selector lever is moved a second larger distance to a second stop in the same deflecting direction, the first stop being overpressed.

2. Motor vehicle according to claim 1, wherein, via the selector lever movable in two deflecting directions, up to four different driving positions (D, R, N, P) can be selected in that the selector lever can be moved into both deflecting directions for selecting one driving position (D, R, N, P) respectively in each case to a first stop, and, for selecting a respective additional driving position (D, R, N, P), the selector lever can be moved a second larger distance, in each case by overpressing the first stop, to a second stop.

3. Motor vehicle according to claim 2, wherein using the selector lever, movable in two deflecting directions, the driving position N is selected in that the selector lever is moved into one of the deflecting directions to the first stop.

4. Motor vehicle according to claim 2, wherein using the selector lever movable in two deflecting directions, the driving position P is selected in that the selector lever is moved into one of the deflecting directions to the first stop.

5. Motor vehicle according to claim 3, wherein using the selector lever movable in two deflecting directions, the driving position P is selected in that the selector lever is moved into one of the deflecting directions to the first stop.

6. Motor vehicle according to claim 2, wherein using the selector lever movable in two deflecting directions, the driving position R is selected in that the selector lever is moved into one of the deflecting directions to the first stop.

7. Motor vehicle according to claim 3, wherein using the selector lever movable in two deflecting directions, the driving position R is selected in that the selector lever is moved into one of the deflecting directions to the first stop.

8. Motor vehicle according to claim 4, wherein using the selector lever movable in two deflecting directions, the driving position R is selected in that the selector lever is moved into one of the deflecting directions to the first stop.

9. Motor vehicle according to claim 2, wherein using the selector lever movable in two deflecting directions, the driving position R is selected in that the selector lever is moved into one of the deflecting directions by being directed upward in a steering wheel plane, by overpressing the first stop, to the second stop.

10. Motor vehicle according to claim 3, wherein using the selector lever movable in two deflecting directions, the driving position R is selected in that the selector lever is moved into one of the deflecting directions by being directed upward in a steering wheel plane, by overpressing the first stop, to the second stop.

11. Motor vehicle according to claim 4, wherein using the selector lever movable in two deflecting directions, the driving position R is selected in that the selector lever is moved into one of the deflecting directions by being directed upward in a steering wheel plane, by overpressing the first stop, to the second stop.

12. Motor vehicle according to claim 6, wherein using the selector lever movable in two deflecting directions, the driving position R is selected in that the selector lever is moved into one of the deflecting directions by being directed upward in a steering wheel plane, by overpressing the first stop, to the second stop.

13. Motor vehicle according to claim 2, wherein using the selector lever movable in two deflecting directions, the driving position D is selected in that the selector lever is moved into one of the deflecting directions by being directed downward in a steering wheel plane, by overpressing the first stop, to the second stop.

14. Motor vehicle according to claim 3, wherein using the selector lever movable in two deflecting directions, the driving position D is selected in that the selector lever is moved into one of the deflecting directions by being directed downward in a steering wheel plane, by overpressing the first stop, to the second stop.

15. Motor vehicle according to claim 4, wherein using the selector lever movable in two deflecting directions, the driving position D is selected in that the selector lever is moved into one of the deflecting directions by being directed downward in a steering wheel plane, by overpressing the first stop, to the second stop.

16. Motor vehicle according to claim 6, wherein using the selector lever movable in two deflecting directions, the driving position D is selected in that the selector lever is moved into one of the deflecting directions by being directed downward in a steering wheel plane, by overpressing the first stop, to the second stop.

17. Motor vehicle according to claim 9, wherein using the selector lever movable in two deflecting directions, the driving position D is selected in that the selector lever is moved into one of the deflecting directions by being directed downward in a steering wheel plane, by overpressing the first stop, to the second stop.

18. Motor vehicle according to claim 1, wherein the driving position P is automatically engaged by the transmission control device when certain operating parameters exist.

19. Motor vehicle according to claim 1, wherein the driving position P is engaged by operating a manually operable operating device independent of the selector lever movement.

20. Motor vehicle according to claim 1, wherein a visual indicating device exists which displays the respectively engaged operating position of the automatically shifted transmission and the operating positions which can be engaged by the selector lever, with the operating device and mode of the selector lever which is required for this purpose.

21. Motor vehicle according to claim 1, wherein by way of the electric transmission control device, alternative operating possibilities of the automatically shifted transmission can be selected such as the step-by-step shifting of the gears in the manual operation or the preselecting of individual driving positions (D, R, N, P) in the automatic operation on the basis of an additional characteristic shifting curve having a sportier adaptation.

22. Motor vehicle according to claim 21, wherein the operating positions of the automatically shifted transmission in the alternative operation are selected at least partially by the selector lever.

23. Motor vehicle according to claim 21, wherein the operating positions of the automatically shifted transmission in the alternative operation are at least partially displayed by the visual indicating device.

24. Motor vehicle according to claim 22, wherein the operating positions of the automatically shifted transmission in the alternative operation are at least partially displayed by the visual indicating device.

* * * * *